Patented June 6, 1950

2,510,803

UNITED STATES PATENT OFFICE 2,510,803

VANADIUM PENTOXIDE CATALYSTS

William C. Cooper, Pittsburgh, Pa., assignor to Pittsburgh Coke & Chemical Company, Pittsburgh, Pa., a corporation of Pennsylvania No Drawing. Application May 13, 1948, Serial No. 26,920

5 Claims. (Cl. 252—464)

This invention relates to oxidation catalysts and more particularly it is concerned with catalysts for use in the vapor phase oxidation of organic compounds comprising vanadium pentoxide as an active component.

The usefulness of vanadium pentoxide as a catalyst for use in the oxidation of organic compounds in the vapor phase at elevated temperatures, e. g., the oxidation of benzene at temperatures between 350 to 550° C. to form maleic anhydride and the oxidation of naphthalene at comparable temperatures to form phthalic anhydride, has been known for many years. Early employment of this material as a catalyst involved the use of the compound per se, spread upon trays or shelves for contact with reaction vapors. An early improvement in the art was the substitution of catalytic masses composed of inert carrier particles coated with vanadium pentoxide prepared by coating the carrier particles with a solution of ammonium vanadate and evaporating off the water. These early catalysts, however, were deficient in catalytic stability and were not sufficiently rugged to permit handling and use on a commercial scale.

Since the time of these early developments, extensive research has been expanded upon the problem of developing more satisfactory catalysts characterized by higher catalytic activity, longer life, higher conversion efficiency, greater oxidation capacity and superior ruggedness. Considerable improvement has been made as a result of this research in the nature of the catalysts comprising vanadium pentoxide, but deficiencies in the catalysts and their method of preparation still exist, e. g., the catalysts may exhibit variations in catalytic activity during the period of use, particularly during the early stages of use, and the procedures for preparation of the catalysts which have been used heretofore have been relatively complicated.

A principal object of this invention is the provision of a new type of catalyst comprising vanadium pentoxide.

Further objects include:

(1) The provision of new procedures for preparing such catalysts, which are characterized by their extreme simplicity.

(2) The provision of such catalysts possessing greater conversion efficiencies, i. e., catalysts capable of giving greater percentage space-time yields than similar materials known heretofore.

(3) The provision of such materials having longer life during use and higher oxidation capacity than similar prior art catalysts.

(4) The provision of such catalytic materials which do not possess the characteristics of variable activity in the early stages of use, i. e., early variability, and which possess very great stability in catalytic activity.

(5) The provision of new procedures for the preparation of vanadium pentoxide containing catalysts which eliminate the necessity for use of a roasting operation.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by preparing an oxidation catalyst by coating discrete particles of an inert carrier base, e. g., small particles of fused alumina or some other inert refractory material, with a colloidal solution of vanadium pentoxide. The colloidal solution of the oxide may be prepared by any satisfactory method which will produce a stable colloidal solution of the oxide, preferably having a concentration of colloidal $V_2O_5$ of between 0.1 to 5% by weight.

The coating of the carrier particles is preferably accomplished by contacting the particles with small successive portions of the colloidal solution and evaporating the water from the colloidal solution substantially as fast as the solution contacts the surface of the carrier particles. The quantity of each successive portion of colloidal solution which is contacted with the mass of carrier particles is controlled so that, at no time, are the carrier particles allowed to contact an accumulation of the solution contained upon the bottom of the vessel used for the coating operation. Other methods may be used for the coating operation, depending to some extent upon the particular carrier base used and the particular style of catalyst desired, but the process outlined above is particularly desirable because the evaporation of an excess amount of catalyst solution in the presence of insufficient carrier base has been found to cause ultimate coagulation and formation of a coating which is easily removed from the carrier.

The success of the present invention is due to a large extent to the discovery that the catalytic coating upon carrier particles, when produced as indicated above, is extremely active, does not exhibit any appreciable changes in catalytic activity during long periods of use, and is extremely adherent to the carrier base. This latter characteristic of these new products is most surprising in view of the fact that catalysts which have been prepared by coating carrier particles with solutions of ammonium vanadate or aqueous suspensions of very finely ground vanadium pentoxide are characterized by relatively low adherence of the catalytic coating to the carrier base, so that such catalysts degenerate more rapidly through loss of the catalytic coating during use. As a matter of fact, comparative tests have shown the adherence of the catalytic coatings, as prepared in accordance with the procedures of this invention, to be greater than any such coatings which have been prepared heretofore. This invention has also involved the unusual discovery that not only are these catalytic coatings of an extremely adherent type, but furthermore, they have been shown through actual use to be more effective and to possess a higher conversion efficiency than comparable products known heretofore.

A more complete understanding of the nature of the products of this invention and the methods for their preparation may be had by reference to the following illustrative examples of actual operations:

Example I

This example illustrates the preparation of a colloidal solution of vanadium pentoxide for use in coating carrier particles.

Sixty grams of ammonium vanadate are heated cautiously to drive off the ammonia and re-oxidize any reduced vanadium compounds. The mass is then raised to a temperature of 850° C. and the molten material is slowly poured into 3000 ml. of distilled water having a temperature of about 20° C., while the entire mass is vigorously agitated. The resulting colloidal solution is finally filtered through ordinary filter paper.

The final product is a deep reddish brown solution containing about 1.5% $V_2O_5$ and is slightly viscous. The solution is very stable and exhibits very little change with age, the only apparent change being a slight increase in viscosity.

Example II

This example illustrates further methods for the production of the colloidal solutions. A colloidal solution was prepared by substituting 47 grams of refined $V_2O_5$ for the ammonium vanadate of the first case. The resulting product appears to be comparable in all respects to the solution of that prepared in accordance with the first case.

Example III

This example illustrates the production of a catalyst for the oxidation of naphthalene to phthalic anhydride.

One hundred grams of 4 to 8 mesh fused alumina is placed in a 500 milliliter flask and the flask is then revolved at 10 to 12 revolutions per minute. The colloidal solution as prepared in Example I is then slowly added dropwise to the flask, while the water in the solution is evaporated by application of heat to the bottom of the flask from a gas flame. The rate of addition of the colloidal solution is adjusted so that evaporation of the water takes place essentially as rapidly as the solution is added to the alumina particles, so that no liquid accumulates upon the bottom of the flask.

The addition of the solution is continued until 300 ml. of the solution have been charged into the flask. There results a catalyst material consisting of alumina particles uniformly coated with a lustrous, gun-metal-blue layer of colloidal vanadium pentoxide, the catalyst coating comprising about 4% by weight of the total product.

Example IV

This example illustrates the preparation of a catalyst by a slightly different procedure than the process of Example III.

One hundred grams of 4 to 8 mesh tabular alumina are placed in a 500 ml. flask provided with a tube dipping into the interior of the flask through which hot air may be blown over and about the particles contained in the flask. With the flask revolving at about 10 to 12 R. P. M., the colloidal solution of Example I is slowly sprayed upon the particles in the flask while hot air is blown over the particles to evaporate the water from the collidal solution. As in Example II, the rate of spraying of the solution is adjusted so that no solution accumulates upon the bottom of the flask. The spraying of the solution is continued until 600 ml. of the solution has been used.

There is obtained a catalytic product consisting of alumina particles uniformly coated with a layer of vanadium pentoxide. The catalyst layer comprises about 6 to 8% of the product. Some vanadium adheres to the walls of the water flask and some is lost through handling.

Example V

This example illustrates the preparation of a pellet-type catalyst.

One hundred parts of a finely-powdered, absorbent silica is mixed with 50 parts of the colloidal solution of Example I with heating to drive off excess water and form a moist granular mass. This product is then sifted to produce grains of 10 to 50 mesh which are pressed into pellets by means of a pelleting machine. The pellets are dried at 130° C. for 10 hours. The resulting catalytic pellets may be used directly in vapor phase oxidations.

Example VI

This example illustrates the preparation of a finely divided catalyst for use in the "socalled" fluidized catalytic procedures.

A catalyst is made by mixing 100 parts of a 2% colloidal $V_2O_5$ solution with 50 parts of finely ground silica and heating the mass while it is agitated to drive off excess water and form a moist granular material. The granular material is then further heated in a rotary drying drum until a completely dry product is obtained. The dried product is ground to a fine powder and sifted to produce a material of 200 to 400 mesh size. The graded powder may be used directly as a catalyst in a fluidized vapor phase oxidation, reaction, e. g., reaction of the type described in U. S. Patent No. 2,373,008 to S. B. Becker.

Example VII

A catalyst of the type employed for the commercial production of phthalic anhydride by oxidation of naphthalene is prepared in accordance with the procedure disclosed in Example III of U. S. Patent No. 2,180,353. The resulting product consists of individual particles of fused alumina uniformly coated with a layer of orange vanadium pentoxide which comprises about 10% of the product.

Example VIII

This example compares the catalytic characteristics of the products of Examples III, IV and VII.

The three separate catalysts, as prepared in Examples III, IV and VII, are tested for catalytic efficiency by charging the catalysts separately on three separate runs into the converter section of a phthalic anhydride generator. In each case, a controlled amount of naphthalene is vaporized with a controlled amount of air so as to provide a gas stream containing vaporized naphthalene and oxygen which is then passed over the catalyst into the converter at 500 to 525° C. at a space velocity of 8700. In each case, the same concentration of naphthalene-air mixture is employed at the same temperature and the same space velocity. In each run, the product produced is collected and quantitatively analyzed for total acids to determine percent of conversion. The following results are obtained:

| Catalyst | Average Conversion Efficiency, Mol Percent Total Acids | |
|---|---|---|
| | After one hour use | After 10 hours use |
| | Per cent | Per cent |
| Catalyst of Example III | 90.5 | 90.3 |
| Catalyst of Example IV | 89.5 | 89.3 |
| Catalyst of Example VII | 83.7 | 87.4 |

The above examples illustrate the use of tabular alumina, fused alumina and refractory silica as carrier materials. However, substantially any relatively inert material, particularly those of a refractory nature, may be employed as a carrier base. Examples of other suitable materials include pumice, silica gel, sand, quartz, silica, carborundum, aluminum, asbestos, kieselguhr, chamotte, fuller's earth, diatomaceous earth, alundum, clay, and similar materials. The particular size of the carrier base may be varied, e. g., ranging in size from fine powder to large lumps, and will depend in part upon the exact process for which the oxidation catalyst is to be used. Actually, if desired, the process of the invention may be employed to provide the wall of a reaction vessel or the like with a catalytic coating. In the case of oxidation of hydrocarbons to polycarboxylic acid anhydrides for which the catalysts of this invention are specially suited in fixed bed converters, the most satisfactory catalytic products are prepared from uniformly sized particles of carrier base of about 2 to 20 mesh.

Example I above illustrates the preferred method for producing the colloidal solutions for use in this invention. However, any other method by which an aqueous dispersion of vanadium pentoxide particles of colloidal size, i. e., particles of such fineness that they exhibit Brownian movement and the Tyndall cone effect and do not settle out of the aqueous mass, can be used to produce these colloidal solutions.

Other methods which may be employed in the production of the colloidal vanadium pentoxide solutions include a peptization method in which thoroughly washed $V_2O_5$ precipitate is dispersed in water, the ester method in which vanadium ester is hydrolized with water, or the method in which the colloidal hydrosol is formed by boiling a solution of $VOCl_3$.

The exact concentration of colloidal $V_2O_5$ in the solution can be varied depending upon the particular method which is employed for coating the carrier particles and also upon the purity of the colloidal solution. The most satisfactory products, however, have been found to be obtained from solutions which contain about 0.1 to 5% and preferably 1.0 to 3% by weight of colloidal $V_2O_5$. Furthermore, the higher purity colloidal suspensions give most satisfactory results, so that distilled water and refined vanadate salts or vanadium pentoxide are preferred for the preparation of the colloidal solutions.

The colloidal solutions may be prepared from a single vanadium salt or the pentoxide or from a mixture of these materials. Furthermore, other materials of colloidal nature may be incorporated in the solution to act as modifiers, to alter the specificity of the catalyst coating or to otherwise modify the catalytic properties of the final products, e. g., other catalytic oxides, such as the heavy metal oxides, including metal oxides of the fifth and sixth groups of the Periodic System, particularly molybdenum oxide. Furthermore, the colloidal solutions can comprise water-soluble, modifying materials which will be coated upon the carrier particles along with the colloidal $V_2O_5$ when the water is evaporated from the solution upon contact with the catalyst particles.

The present invention provides a new type of catalytic materials comprising vanadium pentoxide which exhibit unusually high conversion efficiencies, high oxidation capacity and unusually long life. They are characterized by a catalytic coating of $V_2O_5$ which is discontinuous in that it is made up of particles of colloidal size which permits them to be distinguished from the related products of the prior art. The color of the catalyst changes with the extent of drying of the coat after application to the carrier from the colloidal solution. The color progressively changes from gun-metal-blue to red-brown, and finally to orange or yellow with prolonged heating. The best catalysts are produced when heating is stopped before the catalyst turns orange or yellow. The finished catalysts also generally have a lustrous sheen, although this is not essential to a satisfactory product.

Although particularly useful for production of phthalic anhydride and maleic anhydride, my catalysts can be used in all catalytic, vapor-phase oxidations of organic compounds for which similar catalytic products are known to be useful. These catalysts may be produced in accordance with the invention by a method which is considerably less complicated than even the best methods employed heretofore to provide similar, but less satisfactory, catalytic materials.

I claim:

1. A catalyst for use in the oxidation of naphthalene to phthalic anhydride in the vapor phase at elevated temperatures comprising the product produced by coating particles of an inert, refractory material with vanadium pentoxide by contacting said particles with an aqueous colloidal solution of about 0.1 to 5% vanadium pentoxide, evaporating the water from said solution while in contact with said particles, and repeating the steps of solution contact and evaporation until the particles have an adherent coating of about 0.1 to 50% by weight of vanadium pentoxide.

2. A catalyst for use in the oxidation of naphthalene to phthalic anhydride in the vapor phase at elevated temperatures comprising the product produced by coating particles of fused alumina with between 1 and 10% of an adherent coating of vanadium pentoxide by spraying an aqueous colloidal solution of between 0.1 and 3% by weight of colloidal vanadium pentoxide onto the particles of alumina and evaporating the water from said solution substantially as fast as the solution contacts the particles.

3. A catalyst for use in the oxidation of organic compounds in the vapor phase at elevated temperatures comprising solid, inert carrier particles having an adherent coating of about 0.1 to 10% by weight of the vanadium pentoxide thereon produced by coating said inert carrier particles with a firmly adherent coating of vanadium pentoxide by contacting the carrier particles with an aqueous solution of colloidal vanadium pentoxide comprising 0.1 to 5% vanadium pentoxide and evaporating the water from the colloidal solution while in contact with the carrier particles.

4. A catalyst for use in the oxidation of naphthalene to phthalic anhydride in the vapor phase at elevated temperatures comprising the product produced by coating particles of fused alumina with about 4% by weight of an adherent, lustrous coating of vanadium pentoxide by spraying an aqueous colloidal solution containing about 1.5% colloidal vanadium pentoxide onto hot particles of alumina, whereby water from the solution evaporates substantially as fast as the solution contacts the particles and continuing the spraying of colloidal solution at such a rate that evaporation of water from the solution continues to take place substantially as fast as the solution contacts the carrier particles.

5. A catalyst for use in the oxidation of naphthalene to phthalic anhydride in the vapor phase at elevated temperatures, comprising particles of fused alumina coated with an adherent layer of 6 to 8% by weight of vanadium pentoxide produced by spraying a colloidal solution of about 1.5% by weight of colloidal vanadium pentoxide onto the particles of alumina, simultaneously blowing hot air over the particles to evaporate water from the colloidal solution and controlling the rate of spraying of the colloidal solution so that water evaporates therefrom substantially as fast as the solution contacts said alumina particles.

WILLIAM C. COOPER.

REFERENCES CITED

The following references are of record in the file of this patent:

UNITED STATES PATENTS

| Number | Name | Date |
|---|---|---|
| 2,035,606 | Jaeger | Mar. 31, 1936 |
| 2,065,394 | Punnett | Dec. 22, 1936 |
| 2,180,353 | Foster | Nov. 21, 1939 |

OTHER REFERENCES

Mellor, "Comp. Treatise on Inorg. and Theor. Chem." (1929), vol. 9, p. 750.